United States Patent
Fett

[11] Patent Number: 6,056,663
[45] Date of Patent: May 2, 2000

[54] SHORT SPAN DIFFERENTIAL GEAR ASSEMBLY

[75] Inventor: Gregory Allen Fett, Ft. Wayne, Ind.

[73] Assignee: Dana Corporation, Toledo, Ohio

[21] Appl. No.: 09/302,348

[22] Filed: Apr. 30, 1999

[51] Int. Cl.[7] ............................. F16H 48/20; F16H 48/06
[52] U.S. Cl. ............................................ 475/231; 475/240
[58] Field of Search .................................... 475/230, 231, 475/240

[56] References Cited

U.S. PATENT DOCUMENTS

| | | | |
|---|---|---|---|
| 250,955 | 12/1881 | Ogden . | |
| 275,279 | 11/1883 | Snyder et al. . | |
| 1,145,295 | 7/1915 | Witt . | |
| 1,158,439 | 11/1915 | Bunting . | |
| 1,244,223 | 10/1917 | McInish ................................. | 475/230 |
| 1,421,834 | 7/1922 | Ross . | |
| 1,657,091 | 1/1928 | Morgan ............................... | 475/226 X |
| 3,886,813 | 6/1975 | Baremor ................................. | 475/240 |
| 4,781,079 | 11/1988 | Takahashi ............................. | 475/240 |
| 4,966,249 | 10/1990 | Imaseki ............................. | 475/231 X |
| 5,098,355 | 3/1992 | Long . | |
| 5,445,574 | 8/1995 | Sekiguchi et al. .................. | 475/231 X |

*Primary Examiner*—Charles A. Marmor
*Assistant Examiner*—Roger Pang
*Attorney, Agent, or Firm*—Liniak, Berenato, Longacre, & White

[57] ABSTRACT

A ring gear (50) is provided between a pair of differential case halves (18, 18') integrally formed with teeth defining a pair of side gears (19, 19') that engage differential pinion gears (12, 12') mounted on a pinion shaft (17) to provide a motor vehicle differential gear assembly (100) having reduced components while enabling a limited slip capability controlled by regulating frictional resistance at a thrust surface interface.

17 Claims, 3 Drawing Sheets

SHORT SPAN DIFFERENTIAL GEAR ASSEMBLY

BACKGROUND OF THE INVENTION a) Field of the Invention

This invention relates generally to a vehicular differential gear case and gear assembly for transferring rotational torque from a rotary driver member such as a pinion gear driven by the output shaft of a change gear transmission to a pair of rotary driven members such as paired wheel axle shafts. More particularly, the invention relates to a ring gear and a differential gear assembly wherein the differential case and side gears are combined as a unitary body to provide a unique short span differential.

b) Description of Related Art

Conventional vehicle differential gear assemblies transfer rotational torque from a rotary driver member such as the output shaft of a change gear transmission to a pair of rotary driven members such as a pair of substantially axially aligned spaced-apart axle shafts journaled for rotation and having a wheel mounted on their respective outboard ends.

Such prior art type differential gear assemblies however employ a great number of costly components and fasteners, and they require a large differential housing to protect the numerous components as well as requiring precise positioning of the side gears and fasteners within the differential case.

SUMMARY OF THE INVENTION

Accordingly, it is an object of this invention to provide a short span differential assembly wherein the differential case is integrally formed with the side gears to reduce the number of necessary components and to reduce the number of fasteners and overall size of the differential assembly.

It is another object of this invention to provide a ring gear and a motor vehicle differential gear assembly using a ring gear that is centrally mounted with respect to the differential case to partially receive and retain the pinion shaft.

In a preferred form, the present invention comprises a short span differential assembly wherein each side gear is integrally formed with a differential case half to thereby for a pair of unitary bodies. A pinion shaft is provided between each differential case half and that pinion shaft is disposed partially within a slot at the ring gear/differential case interface to thereby provide a thrust surface. A limited slip capability may be provided by controlling the coefficient of friction at the thrust surface, i.e., between the ring gear and each differential case half It is further possible to provide a thrust bearing for low friction at those thrust surfaces.

Therefore, the invention is simple and economical to manufacture and advantageously reduces the number of components heretofore used in vehicle differentials, thus the precise alignment and fastening arrangement required for the differential gears is simplified.

DESCRIPTION OF PREFERRED EMBODIMENTS

Figure 1:
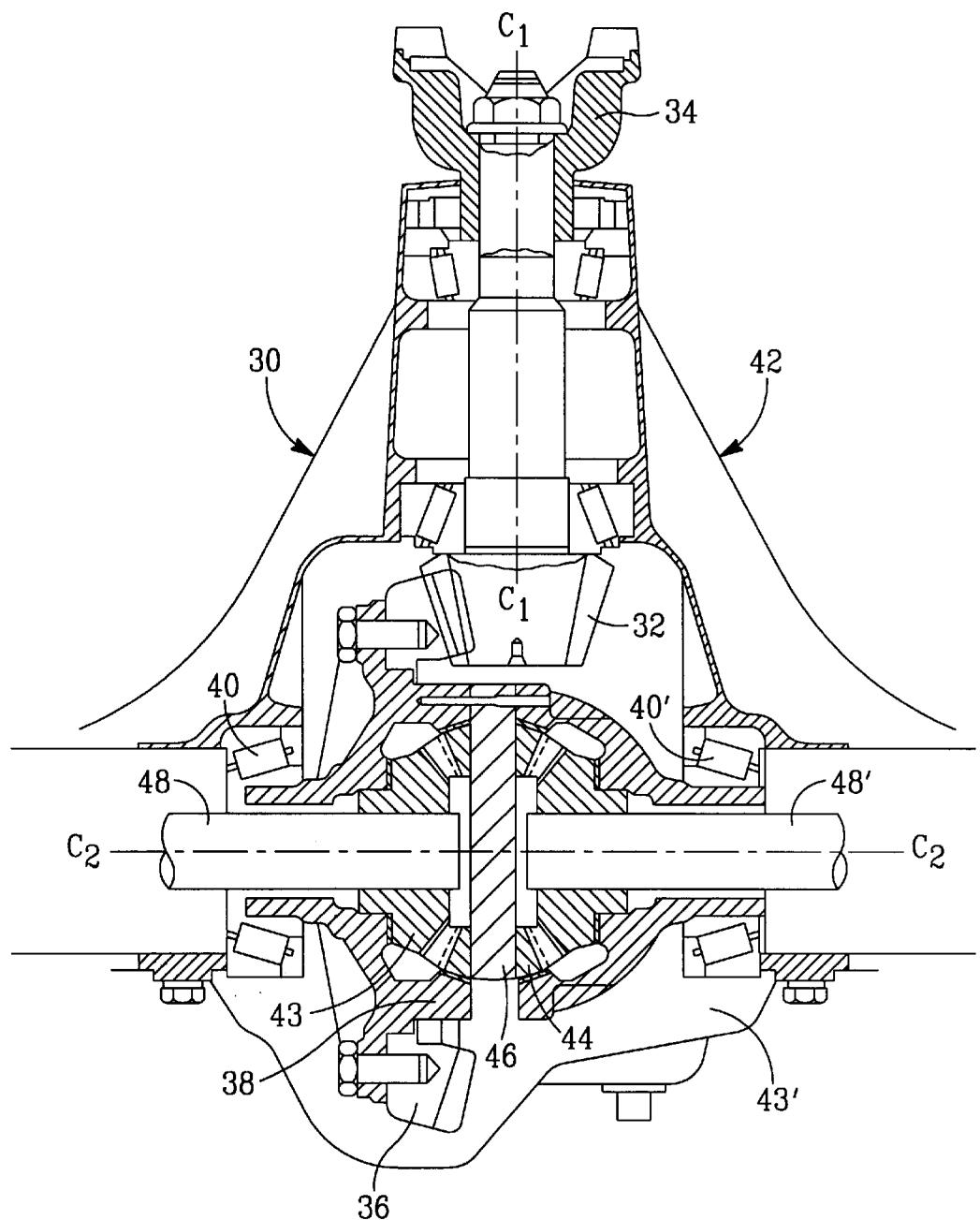
FIG. 1 is a cross-sectional view of a prior art differential gear assembly.

The prior art differential gear assembly 30 shown in FIG. 1 is of the type hereinbefore described requiring numerous components and a much larger housing to enclose them.

Assembly 30 transfers rotary torque from a pinion gear 32 driven by a rotary output shaft 34 of a change gear transmission to a ring gear 36 having teeth meshingly engaged with teeth on ring gear 36. Ring gear 36 is secured to a case 38 that is journaled for rotation relative housing 42 by means of bearings 40. As such, ring gear 36 and case 38 rotate coaxially about axle shaft 48 that has an side gear 43 secured to its inboard end by suitable means such as splines. It can thus readily be seen from FIG. 1 that prior art differential gear assemblies required precise and costly alignment between the ring gear and the differential housing.

Axle shaft 48 is spaced-apart from and substantially axially aligned with axle shaft 48' which has an side gear 43' secured to its inboard end in facing relationship to end gear 43. Axle shafts 48 and 48' have a common central rotational axis $C_2$ that is substantially perpendicular to central rotational axis $C_1$ of pinion gear 32.

Side gears 43 and 43' are meshingly engaged with at least two spaced differential pinion gears 44 that are rotatably mounted on case 38 by means of a pin 46. Rotation of case 38 by ring gears 36 causes differential pinion gears 44 to rotate about axis $C_2$ and in turn cause side gears 43 and 43' to rotate axle shafts 48 and 48' about axis $C_2$ respectively.

As can be seen in FIG. 1, axle shaft 48' is journaled for rotation relative housing 42 by means of bearings 40' and both axle shafts 48 and 48' can be removed from housing 42 with relative ease due to the splined securement with their respective end gears but that precise alignment between ring gear 36 and case 38 and between differential pinion gears 44 and side gears 43 and 43' is essential.

The ring gear and differential gear assembly of the invention hereinafter described with respect to FIGS. 2 and 3 enable the elimination of the several key components such as the fasteners required for the side gears 43, 43', the bolts required to secure the ring gear 36 to the differential case 38, and the pin(s) securing the differential shaft 46 to the differential case. By combining the side gears 19, 19' into the differential case halves 18, 18', the invention essentially eliminates the differential case typically employed in the prior art differential assemblies. Therefore, the invention enables a substantial reduction in the size of housing 42 due to the formation of the differential case, ring gear and side gears.

Ring gear 50 has a plurality of substantially evenly circumferentially spaced teeth 8 extending away from the side thereof between outer periphery 4 and inner periphery 6. Teeth 8 are preferably spiral bevel or hypoid type teeth having a curved tooth path profile to enhance smooth engagement with the teeth of pinion gear 16 which is also preferably provided with curved teeth for promoting smooth continuous mesh with teeth 8 of ring gear 50. The use of spiral bevel or hypoid teeth in vehicle differential gear assemblies to enhance smooth transfer of torque is well known to those skilled in the art and is not therefore reviewed here in detail.

Differential pinion gears 12 have diametrically opposed teeth operative to simultaneously meshingly engage with the teeth of side gears 19 and 19' hereinafter described with respect to differential gear assembly 100 of FIG. 2.

Figure 2:
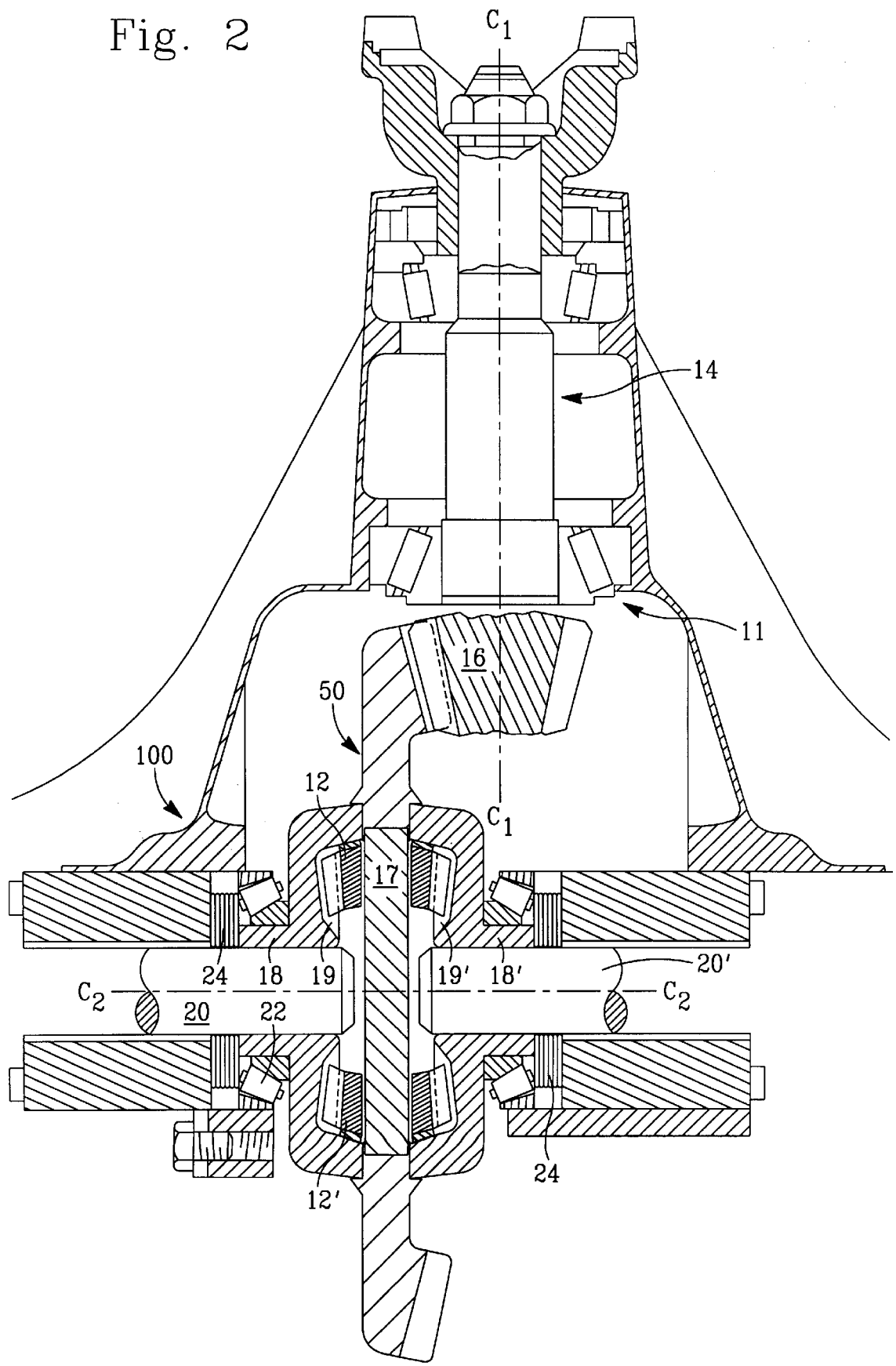
FIG. 2 is a cross-sectional view of an embodiment of a differential gear assembly 100 of the invention.

In FIG. 2, a rotary driver member such as output shaft 14 of a vehicle change gear transmission is received through an opening in a housing 11 and suitably journaled for rotation. Shaft 14 has a pinion gear 16 secured to its end having a central rotational axis referenced by $C_1$. Central rotational axis $C_2$ of ring gear 50 is substantially perpendicular to axis $C_1$ and the teeth of both ring gear 50 and pinion gear 16 are adapted to meshingly engage so that ring gear 50 rotates in response to rotation of pinion gear 16.

Ring gear 50 is disposed between the differential case halves 18, 18' in the space between the ends of substantially axially aligned wheel axle shafts 20 and 20' that also have axis $C_2$ as their common central rotational axis. Side gears 19 and 19' are integrally formed as part of the differential case halves 18, 18', respectively, and they are secured to the spaced-apart facing ends of axle shafts 20 and 20' respectively by suitable securement means such as splines (not shown) and are journaled for rotation therewith. The teeth of side gears 19 and 19' are adapted to meshingly engage with the teeth of differential pinion gears 12, 12' with the combination adapted to provide support for ring gear 50 in the space between the ends of axle shafts 20 and 20' as well as to enable ring gear 50 to rotate axle shafts 20 and 20' as it is rotated by pinion gear 16.

The differential pinion gears 12, 12' are disposed on the pinion shaft 17 that is fittingly received in a slot formed in the ring gear 50.

Figure 3:
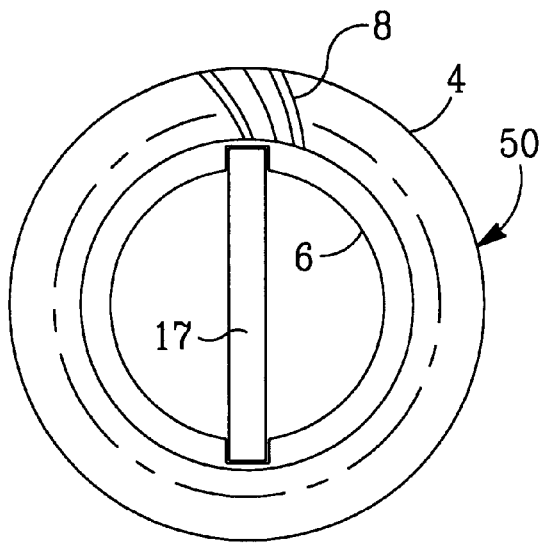
FIG. 3 is a cross-sectional view of the ring gear and pinion shaft of this invention as viewed along section line III—III of FIG. 2.

FIG. 3 is a cross sectional view of the ring gear 50 and pinion shaft 17, whereby the pinion shaft 17 is mounted within a suitable slot formed in the ring gear 50. The ring gear 50 drives the pinion shaft which in turn drives the differential pinion gears 12, 12'.

Significant to this invention is the limited slip capability that may be controlled by controlling the thrust surface friction between the ring gear 50 and the differential case halves 18, 18'. By controlling the thrust surface friction between these interfaces the short span differential of this invention may provide a limited slip capability. If limited slip capability is not desired, a thrust bearing may be used at this location to lower the friction.

In the preferred embodiment, the limited slip differential capability is controlled by controlling the thrust surface interfaces between the ring gear 50 and the differential case halves 18, 18'. The pre-load on the thrust surfaces, as well as the coefficient of friction and the amount of surface area will determine and control the limited slip capability. For example, the bearings 22, 22' may be suitable preloaded by threaded adjusters or an interference-fit in the carrier housing to enhance the limited slip capability. Belleville springs or washers 24 may be used to insure that the preload on the thrust surface is not lost as the bearings wear. Likewise, the preload can be manually controlled by a piston or threaded adjuster.

The foregoing invention has been shown and described with reference to a preferred embodiment, however, it will be understood by those skilled in the art that various changes in form and detail may be made therein without departing from the spirit and scope of the invention.

What is claimed is:

1. A vehicular differential gear assembly for transferring rotational torque between a pinion gear rotatably driven by a driver member and a pair of substantially axially aligned spaced-apart rotary driven members that are respectively journaled for rotation, said assembly comprising;
    a pair of differential case halves rotatably mounted within a differential housing, wherein side gear teeth are integrally formed on each of said differential case halves, said differential case halves being formed with splines for matingly engaging said spaced-apart rotary driven members;
    a ring gear disposed between the case halves, said ring gear having an annular configuration defined between an inner periphery and an outer periphery thereof and having a central rotational axis in substantial perpendicular relationship to a pinion gear central rotational axis, said ring gear having a periphery thereof and engageable with the pinion gear teeth so as to enable the ring gear to be rotatably driven thereby;
    a pinion shaft mounted to rotate with said ring gear,
    at least one differential pinion gear mounted on said pinion shaft, each of said differential pinion gears having diametrically opposed teeth that simultaneously meshingly engage the side gear teeth integrally formed on said differential case halves;
    limited slip adjustment mechanism comprising at least one thrust surface interface providing a limited slip capability for said assembly, wherein said thrust surface interface limits a relative rotation of each of said spaced-apart rotary driven members.

2. The assembly of claim 1, wherein said limited slip adjustment mechanism comprises a pre-load assembly for a bearing for increasing a frictional resistance at said thrust surface interface.

3. The assembly of claim 2, wherein said preload assembly comprises a resilient member applying a force to said bearing.

4. The assembly of claim 3, wherein said resilient member comprises a Belleville spring.

5. The assembly of claim 2, wherein said pre-load assembly comprises a threaded washer applying an adjustable force to said bearing.

6. The assembly of claim 1, wherein said limited slip adjustment mechanism comprises a pre-load assembly for increasing a frictional resistance at said thrust surface interface by applying a force to at least one of said differential case halves.

7. The assembly of claim 6, wherein said pre-load assembly comprises a member applying a force to increase a frictional resistance at said thrust surface interface.

8. The assembly of claim 7, wherein said member comprises at least one of a Belleville spring, a threaded washer, and a piston.

9. The assembly of claim 1, wherein said limited slip adjustment mechanism comprises a pre-conditioned surface roughness provided at said thrust surface interface to provide a predetermined frictional resistance.

10. The assembly of claim 1, wherein said differential case halves and said ring gear encapsulate said side gear teeth.

11. The assembly of claim 1, wherein the ring gear is provided with diametrically opposed slots receiving said pinion shaft is received in and extends between said diametrically opposed slots.

12. The assembly of claim 1, wherein the ring gear teeth are spiral bevel teeth.

13. The assembly of claim 1, wherein the ring gear teeth are hypoid teeth.

14. The assembly of claim 1, wherein said thrust surface interface is provided between said ring gear and at least one of said differential case halves.

15. The assembly of claim 1, wherein said thrust surface interface is provided between said ring gear and said pinion shaft.

16. The assembly of claim 1, wherein said thrust surface interface is provided between said pinion shaft and said at least one differential pinion gear.

17. The assembly of claim 1, wherein said thrust surface interface comprises a thrust bearing for providing a predetermined frictional resistance.

* * * * *